United States Patent
Judd et al.

(10) Patent No.: US 10,425,149 B1
(45) Date of Patent: Sep. 24, 2019

(54) ACARS OVER IP SYSTEM FOR NON-SAFETY MESSAGES

(71) Applicant: Honeywell International Inc., Morris Plains, NJ (US)

(72) Inventors: Thomas D. Judd, Woodinville, WA (US); Thomas F. McGuffin, Bellevue, WA (US); Scott James Redmond, Phoenix, AZ (US); Justin Schassler, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/109,474

(22) Filed: Aug. 22, 2018

(51) Int. Cl.
*H04B 7/185* (2006.01)

(52) U.S. Cl.
CPC .................. *H04B 7/18506* (2013.01)

(58) Field of Classification Search
CPC ................................................ H04B 7/18506
USPC .......................................................... 455/431
See application file for complete search history.

(56) References Cited

U.S. PATENT DOCUMENTS

| | | | |
|---|---|---|---|
| 7,519,014 B2 | 4/2009 | Allen et al. | |
| 8,285,865 B2 | 10/2012 | Gruyer et al. | |
| 8,462,799 B2 | 6/2013 | Molsbeny et al. | |
| 2006/0080451 A1 | 4/2006 | Eckert | |
| 2009/0041041 A1 | 2/2009 | True et al. | |
| 2011/0255506 A1 | 10/2011 | Toth et al. | |

OTHER PUBLICATIONS

Bellamy III, Woodrow, "Integrating IP into ACARS Transmissions", "http://interactive.aviationtoday.com/integrating-ip-into-acars-transmissions/" Dated May 31, 2018, pp. 1-11, Publisher: Aviation Today.
Prendergast, Dan, "The Evolution of ACARS Series with Rockwell Collin' Dan Pendergast", Dated Jan. 25, 2018, pp. 1-8, Connected Aviation Today, Publisher: Rockwell Collins.

*Primary Examiner* — Joel Ajayi
(74) *Attorney, Agent, or Firm* — Fogg & Powers LLC (57) ABSTRACT

A communication system in an aircraft is described. The communication system includes a CMU that is coupled to at least one safety subnetwork and an AOIP computing device. The AOIP computing device is coupled to at least one non-safety subnetwork. The AOIP computing device determines whether ACARS messages received from the CMU are ACARS safety messages or ACARS non-safety messages. The AOIP computing device monitors CMU status messages from the CMU. In response to the AOIP computing device receiving an ACARS safety message, the AOIP computing device periodically transmits a second status message indicating that the AOIP computing device is unavailable. In response to determining that at least one safety subnetwork is available, the AOIP computing device stops periodically transmitting the second status message and transmits a first status message indicating that the AOIP computing device is available.

20 Claims, 6 Drawing Sheets

ACARS OVER IP SYSTEM FOR NON-SAFETY MESSAGES

BACKGROUND

Today's Aircraft Communications Addressing and Reporting System (ACARS) datalink communications is expensive, utilizing ACARS subnetworks (e.g., very high frequency (VHF), satellite communications (SATCOM) and/or high-frequency (HF)) via datalink service providers, such as Aeronautical Radio, Incorporated (ARINC) and Société Internationale de Télécommunications Aéronautiques (SITA).

Other servers in the aircraft (e.g., ADG300 (Aspen), Wireless Server Unit (WSU), ADG400 (1 aero wireless server), etc.) may have access to cheaper, higher-bandwidth internet protocol (IP) broadband links, such as Wi-Fi, cellular, and/or broadband SATCOM links.

However, these other IP broadband servers may not be approved to transmit or receive ACARS safety messages. Accordingly, it may be beneficial to enable ACARS non-safety messages to be transmitted over IP, broadband links that are not approved to transmit ACARS safety messages.

SUMMARY

A communication system in an aircraft is disclosed. The communication system includes a CMU that is coupled to at least one safety subnetwork and an AOIP computing device. The AOIP computing device is coupled to at least one non-safety subnetwork. The AOIP computing device determines whether ACARS messages received from the CMU are ACARS safety messages or ACARS non-safety messages. The AOIP computing device monitors CMU status messages from the CMU. In response to the AOIP computing device receiving an ACARS safety message, the AOIP computing device periodically transmits a second status message indicating that the AOIP computing device is unavailable. In response to determining that at least one safety subnetwork is available, the AOIP computing device stops periodically transmitting the second status message and transmits a first status message indicating that the AOIP computing device is available.

BRIEF DESCRIPTION OF THE DRAWINGS

Embodiments of the present invention can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

As mentioned above, some aircraft servers may have access to IP broadband links, such as Wi-Fi, cellular, and/or broadband SATCOM links (other than the VHF, HF, and SATCOM datalinks approved to transmit ACARS safety messages). These other IP broadband servers may interface with a communications management unit (CMU) on the aircraft to transmit and receive ACARS messages via those IP broadband subnetwork links.

A peer server on the ground may act as the peer to the CMU and provide access to ACARS messages to and from operators (e.g., ground or in-flight service providers, airlines, etc.). These ACARS over IP (AOIP) communications may utilize cheaper, higher bandwidth links and bypass high cost datalink service providers (DSPs) such that the peer server on the ground acts like a DSP. This communication path may not be approved to transmit ACARS safety messages, so it may not be connected to Air Traffic Control or air navigation service providers (ANSPs) on the ground. Rather, the AOIP traffic may be transmitted to and from airline operators and/or business & general aviation (BGA) operators (such as Honeywell GoDirect), e.g., via an ARINC A20 interface.

In one possible configuration, a CMU may be connected to an AOIP capable device (e.g., server) supporting only non-safety messages via an HF radio port (or SATCOM radio port if the VHF subnetwork is the only safety subnetwork accessible to the CMU). From the perspective of the CMU, the AOIP server may look like an HF radio (or SATCOM radio) supporting ACARS safety messages. However, in such a configuration, the CMU may require updating to prevent non-safety messages from being routed over the "fake" HF radio subnetwork interface.

Many CMUs only interface to communication subnetworks that support both ACARS safety messages and ACARS non-safety messages. Most CMUs don't have logic to prevent ACARS safety messages from being sent over a "non-safety only" (i.e., Air Operator's Communications (AOC) only) subnetwork, like an AOIP-capable server (e.g., ADG300) solution.

In order to utilize the IP broadband links to transmit ACARS non-safety messages, any solution should be compatible with various different CMUs and communication management functions (CMFs) that are deployed today. Some of these CMU and CMF and devices are old and unlikely to be updated.

Therefore, the problem addressed herein is how to connect an AOIP-capable server to the CMU 106 (e.g., via the HF or SATCOM ARINC-429 (A429) port) while not causing safety concerns. Furthermore, any solution should be implemented without having to update the CMU software (other than, for example, configuration updates to the Aircraft Personality Module (APM) or loadable AOC configuration database) or re-certify the AOIP-capable server (e.g., ADG300) to RTCA DO-178B level D or above (i.e., remains level E), which is costly and time-consuming.

Another challenge is ensuring that the AOIP system does not interfere with the safety messaging procedures in place. For example, if a safety message were sent via the AOIP-capable server, the AOIP system may not be able to deliver the message because it is not connected to ATC or ANSP, and there may be no mechanism to reject the message. Even if there were a discard mechanism, the message may not be finally declared undelivered (e.g., with "NO COMM" alert) for a long time (e.g., 10-12 minutes), after which the safety message may be delivered to another communication subnetwork (assuming it becomes available again). Furthermore, if it acknowledges the message, then the ATC application would indicate the message was delivered when it really wasn't, which could mislead the pilot or application that the message was received. During the 10-12 minute period, ACARS may transmit one message at a time per subnetwork, and this message may be higher priority than non-safety messages. Accordingly, the AOIP server described herein may block non-safety messages from being sent while the safety message-approved subnetworks are unavailable and the most-recent message was a safety message.

Figure 1:
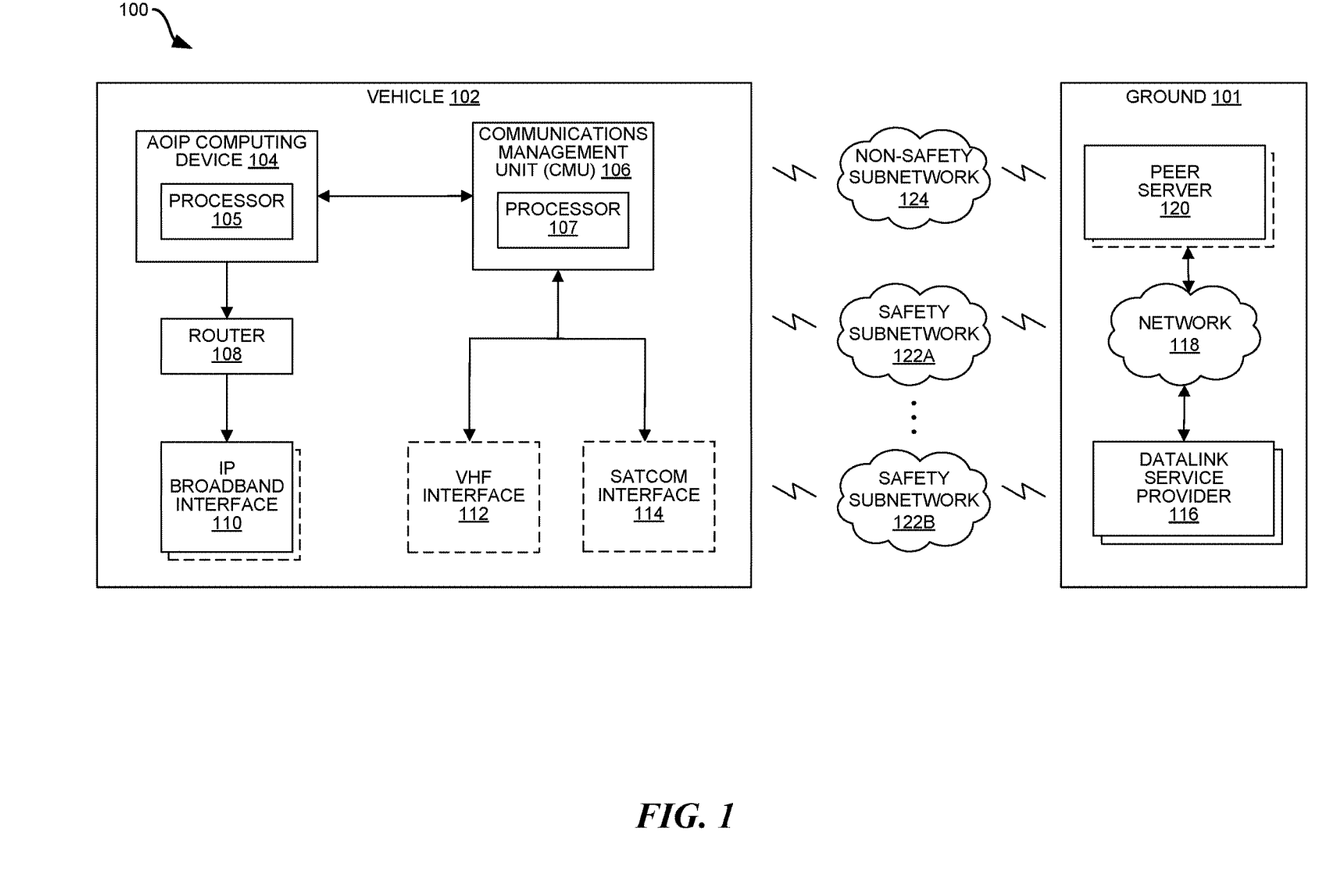
FIG. 1 is a block diagram illustrating an example ACARS over IP system for non-safety messages.

FIG. 1 is a block diagram illustrating an example ACARS over IP system 100 for non-safety messages. The system 100 may include a vehicle 102 that communicates with one or more datalink service providers (DSPs) 116 and/or one or more peer servers 120 on the ground 101.

For pedagogical purposes, the vehicle 102 may be described as an aircraft herein, e.g., an airplane, helicopter, etc. However, it is understood that the vehicle 102 may be any vehicle 102 that travels via land, air, space, and/or sea, e.g., an automobile, train, boat, submarine, aerial drone, spacecraft, etc.

As used herein, the term "uplink" refers to communications sent from the ground 101 (e.g., datalink service provider 116 or a peer server 120) to the vehicle 102. The term "downlink" refers to communications sent from the vehicle 102 to the ground 101 (e.g., to a datalink service provider 116 or a peer server 120).

The vehicle 102 may include avionics equipment, including but not limited to, an AOIP computing device 104, a communications management unit (CMU) 106, and a router 108. Additionally, the vehicle 102 may include one or more communication interfaces that are used to transmit downlink messages to the ground 101 and receive uplink messages from the ground 101. The vehicle 102 may also connect to ACARS end systems to send/receive ACARS messages with the ACARS device (not shown). The ACARS may communicate non-safety messages, or safety and non-safety messages.

The CMU 106 in the vehicle 102 may act as a router for transmitting and receiving datalink messages to and from the ground 101. The CMU 106 may be communicatively coupled to the AOIP computing device 104, as well as other avionics devices. Datalink messages to and from the CMU 106 may use an industry-standard protocol called Aircraft Communications Addressing and Reporting System (ACARS). ACARS messages may be ACARS safety messages or ACARS non-safety messages. Although not shown, the CMU may also include applications that send and receive ACARS messages.

ACARS safety messages, without limitation, typically go to and from air traffic control (ATC) and may relate to the safety and air traffic control of the aircraft, e.g., permission to change altitude or heading, ATC flight tracking and/or monitoring, etc. Examples of safety messages include, without limitation, FANS 1/A CPDLC, ADS-C, and ARINC 623 ATS (includes D-Taxi, D-Departure Clearance, D-Taxi, etc.) messages. ACARS non-safety messages may be operational control messages (such as maintenance-related communications, aircraft operations communications, etc.) transmitted (via the peer server 120 on the ground 101) to and from airline operators and/or business & general aviation (BGA) operators, e.g., in-flight service providers, ground service providers, etc.

The CMU 106 may communicate with other avionics devices on an ARINC-429 (A429) data bus, i.e., a multiple-receiver, single-transmitter data bus used by communication, navigation, surveillance, and/or control devices the vehicle 102. The ARINC-429 bus is used to interface to line-replaceable units (e.g., radios and ACARS end systems). The A429 bus has protocols running over them to send and receive files/messages, such as ACARS messages. Specifically, the CMU 106 may communicate (e.g., using the A429 data bus) with an optional VHF interface 112, an optional SATCOM interface 114, and/or an optional HF interface (not shown), all of which may be approved to transmit ACARS safety messages. The CMU 106 may be communicatively coupled to the optional VHF interface 112, the optional SATCOM interface 114, and/or the optional HF interface on a VHF port, a SATCOM port, and an HF port of the CMU 106, respectively.

The optional VHF interface 112 may include a VHF radio configured to wirelessly communicate at least ACARS messages to and from one or more VHF datalink service providers 116 on VHF frequencies, i.e., 30-300 MHz. VHF datalink service provider(s) 116 on the ground 101 may receive downlink ACARS messages and route them to the appropriate places like ATC or Airline/Aircraft Operations center, e.g., using a network 118, such as the Internet. The VHF datalink service provider(s) 116 may also transmit uplink ACARS messages from an airline operations center or ATC and transmit them to the vehicle 102 via the VHF interface 112 (or SATCOM or HF).

The optional SATCOM interface 114 may include a SATCOM radio configured to wirelessly communicate at least ACARS messages to and from one or more SATCOM datalink service providers 116 via one or more satellites. SATCOM datalink service provider(s) 116 on the ground 101 may receive downlink ACARS messages from the vehicle 102 (via a satellite) and route them to the appropriate places, e.g., using the network 118. The SATCOM datalink service provider(s) 116 may also transmit uplink ACARS messages from an airline operations center or an air traffic controller (ATC) and transmit them to the vehicle 102 (via a satellite). The SATCOM datalink service provider(s) 116 may also interface with ACARS service provider(s). In some cases, a SATCOM datalink service provider may also be an ACARS service provider.

The optional HF interface (not shown) may also include an HF radio configured to wirelessly communicate with an HF datalink service provider 116 on HF frequencies, i.e., 3-30 MHz. In some cases, the HF service provider 116 may also be a VHF service provider 116 and/or a SATCOM service provider 116.

In some configurations, the preferred subnetworks for ACARS safety messages (according to the CMU 106) may be (in order of priority, from highest to lowest): VHF, SATCOM, and HF (if present). For example, the SATCOM may only (or primarily) be used in areas without VHF service (e.g., over the oceans) or when VHF isn't available, and HF may only (or primarily) be used if VHF and SATCOM aren't available (e.g., near the earth's poles).

The optional VHF interface 112, optional SATCOM interface 114, and optional HF interface (not shown), to the extent they are present on the vehicle 102, may each interface with a corresponding safety subnetwork 122A-B, i.e., a subnetwork that is approved to transmit ACARS safety messages. For example, the optional VHF interface 112 communicates across a VHF subnetwork, etc. It should be noted that the vehicle 102 may include less than all of the VHF interface 112, the SATCOM interface 114, and the HF interface, but preferably includes at least one interface to a safety subnetwork 122. In one configuration, the vehicle 102 may include a VHF interface 112 and/or a SATCOM interface 114, but not an HF interface. In such a configuration, the AOIP computing device 104 may be communicatively coupled to the CMU 106 on the HF port.

In some cases, the ACARS service provider is also an HF, VHF, and/or SATCOM service provider 116, e.g., ARINC or SITA. In such a case, one or more of the optional VHF interface 112, optional SATCOM interface 114, and optional HF interface may interface with aircraft via VHF, SAT, and HF and communicate to AOC Centers and Air traffic control centers.

Each IP broadband interface 110 may include an IP broadband radio configured to wirelessly communicate (on a respective IP subnetwork) with a respective peer server 120, e.g., a cellular radio to communicate on a cellular subnetwork, a Wi-Fi radio to communicate via a Wi-Fi subnetwork, and/or an IP broadband non-ACARS SATCOM radio (different from the SATCOM interface 114) to communicate on an IP broadband non-ACARS SATCOM subnetwork. The IP broadband SATCOM subnetwork may connect to a ground server, which then connects to an airline operations center. The cellular, Wi-Fi, and IP broadband non-ACARS SATCOM subnetworks may be considered non-safety networks 124 because they are not approved to transmit ACARS safety messages. The vehicle 102 may use different non-safety subnetwork 124 in different circumstances, e.g., the vehicle 102 may use the cellular subnetwork and/or the Wi-Fi subnetwork on the ground 101, and a IP broadband SATCOM subnetwork in the air. While cellular, Wi-Fi, and IP broadband non-ACARS SATCOM are discussed as example non-safety subnetworks 124 herein, any wireless, packet-based, broadband subnetwork may be used to implement the non-safety subnetworks 124.

As mentioned above, the safety subnetworks 122 (e.g., accessed by the VHF interface 112 and/or the SATCOM interface 114) may each be approved to transmit ACARS safety messages (e.g., by the Federal Aviation Administration (FAA)), while the non-safety subnetwork(s) 124 may not be approved to transmit ACARS safety messages. Furthermore, the safety subnetworks 122 may have relatively low bandwidth and may be expensive to use when compared to the non-safety subnetwork(s) 124. Accordingly, it may be efficient and cost-effective to use the non-safety subnetwork(s) 124 to transmit ACARS non-safety messages.

The AOIP computing device 104 may act as an Aircraft Data Gateway (ADG), i.e., a server that communicates with the peer server 120 on the ground 101. The AOIP computing device 104 may be implemented using one or more processors 105 that execute instructions stored in a memory. The AOIP computing device 104 may be communicatively coupled to the CMU 106 on an HF (or SATCOM) port of the CMU 106. Accordingly, the AOIP computing device 104 may appear, to the CMU 106, as an HF (or SATCOM) radio/interface.

In order to facilitate transmission of ACARS non-safety messages on a non-safety subnetwork 124, the AOIP computing device 104 may also be communicatively coupled to at least one IP broadband interface 110 directly or via a router 108 (e.g., a GoDirect router). The CMU 106 may perform subnetwork/interface selection for ACARS messages using a database that indicates an order of priority for various messages. For example, the CMU 106 may include (or be communicatively coupled to) a database that assigns an HF port of the CMU 106 (that the AOIP computing device 104 is connected to) as the highest priority port for ACARS non-safety messages and the lowest priority port for ACARS safety messages. Alternatively, the database may assign a SATCOM port on the CMU 106 (that the SATCOM interface 114 is connected to) as the highest priority port for ACARS non-safety messages and the lowest priority port for ACARS safety messages.

However, a potential problem arises because the AOIP computing device 104 may be connected to the CMU 106 on a port (e.g., an HF port) that is approved from the CMU 106 perspective to transmit ACARS safety messages and ACARS non-safety messages, however, the AOIP computing device 104 may only have access to the IP broadband interface 110, which is not approved to transmit ACARS safety messages. For example, when all higher priority ports (e.g., VHF and/or SATCOM) on the CMU 106 are unavailable, the CMU 106 may attempt to route an ACARS safety messages through the HF port (that the AOIP computing device 104 is connected to) even though the AOIP computing device 104 and the IP broadband interface(s) 110 are not approved to transmit ACARS safety messages.

Furthermore, the CMU 106 may not transmit subsequent ACARS safety messages until it receives acknowledgment for the most recently sent ACARS safety message. Therefore, an untransmitted (and unacknowledged) ACARS safety message may preventing subsequent ACARS safety messages from being transmitted for a period of time.

In order to prevent and/or minimize these potential problems, the AOIP computing device 104 may determine whether ACARS messages received from the CMU 106 are ACARS safety messages or ACARS non-safety messages. The AOIP computing device 104 may identify ACARS safety messages by looking at addressing information in the packet header of the ACARS message, i.e., a label field or label and sublabel fields in the packet header.

Additionally, the AOIP computing device 104 may monitor CMU status messages that are broadcast by the CMU 106 (e.g., once per second) on the A429 data bus. Each CMU status message may be a 32-bit status word on the A429 bus, including a header and a payload. The payload may include a bit for each of the safety subnetworks 122 that indicates availability of a respective safety subnetwork 122.

Prior to receiving an ACARS safety message (and/or determining that all safety subnetworks 122 are unavailable), the AOIP computing device 104 may be in an "available mode". While in the available mode, the AOIP computing device 104 may receive ACARS non-safety messages from the CMU 106 and transmit them to a peer server 120 via an IP broadband interface 110 and non-safety subnetwork 124. In available mode, the AOIP computing device 104 may also transmit (e.g., periodically broadcast) a first status message indicating that the AOIP computing device 104 (and corresponding port) is in available mode. Each first status message may be a status word that is transmitted on the A429 bus that the CMU 106 can read. While in the available mode, the AOIP computing device 104 may also discard any ACARS safety messages it receives from the CMU 106.

In response to the receiving an ACARS safety message (and/or determining that all safety subnetworks 122 are unavailable), the AOIP computing device 104 may periodically transmit a second status message indicating that the AOIP computing device 104 is unavailable. In other words, when the most recently received ACARS message is an ACARS safety message, the AOIP computing device 104 may periodically broadcast a second status message indicating unavailability of the AOIP computing device 104 to transmit any messages on the at least one IP broadband interface 110. Each second status message may be a status word that is transmitted on the A429 bus that the CMU 106 can read. This AOIP computing device 104 state (i.e., periodically transmitting second status messages) may be referred to herein as "unavailable mode". The AOIP computing device 104 may also discard any received ACARS safety messages while in unavailable mode. Optionally, the AOIP computing device 104 may also be required to (while the AOIP computing device is in available mode) determine that all safety subnetworks 122 (e.g., the VHF interface 112 and/or the SATCOM interface 114) are unavailable before transitioning to unavailable mode. It should be noted that, while in unavailable mode, the AOIP computing device 104 may preferably not transition to available mode in response only to receiving an ACARS non-safety message (while all safety subnetworks 122 are still unavailable).

In response to subsequently determining that at least one of the safety subnetworks 122 is available, the AOIP computing device 104 may stop transmitting the second status message and, instead, transmit (e.g., periodically broadcast) a first status message indicating that the AOIP computing device 104 is available. In other words, when at least one safety subnetwork 122 becomes available (while the AOIP computing device 104 is in unavailable mode), the AOIP computing device 104 may transition back to available mode. Optionally, the AOIP computing device 104 may also be required to (while the AOIP computing device 104 is in unavailable mode) determine that at least one non-safety subnetwork 124 is available (e.g., by viewing a CMU status message) before transitioning from unavailable mode to available mode. In available mode, the AOIP computing device 104 may resume transmitting ACARS non-safety messages (received from the CMU 106) to a peer server 120, while discarding any ACARS safety messages received from the CMU 106.

The ACARS over IP system 100 may provide low cost, high bandwidth AOIP service on a wide range of aircraft that would otherwise require a significant avionics upgrade, i.e., CMU 106 software upgrade and, in many cases, a CMU hardware platform upgrade. The AOIP system 100 may work with older CMUs/CMFs/ATSUs. In other words, the ACARS over IP system 100 described herein may provide an AOIP solution without requiring a CMU 106 (or equivalent) upgrade. Furthermore, the AOIP computing device 104 may also be able to remain level E and not have to be certified, e.g., to level D. With the approach described herein, the AOIP computing device 104 may not have to go through validation to be approved for safety services, which may take around 2 of operational flight testing.

Figure 2:
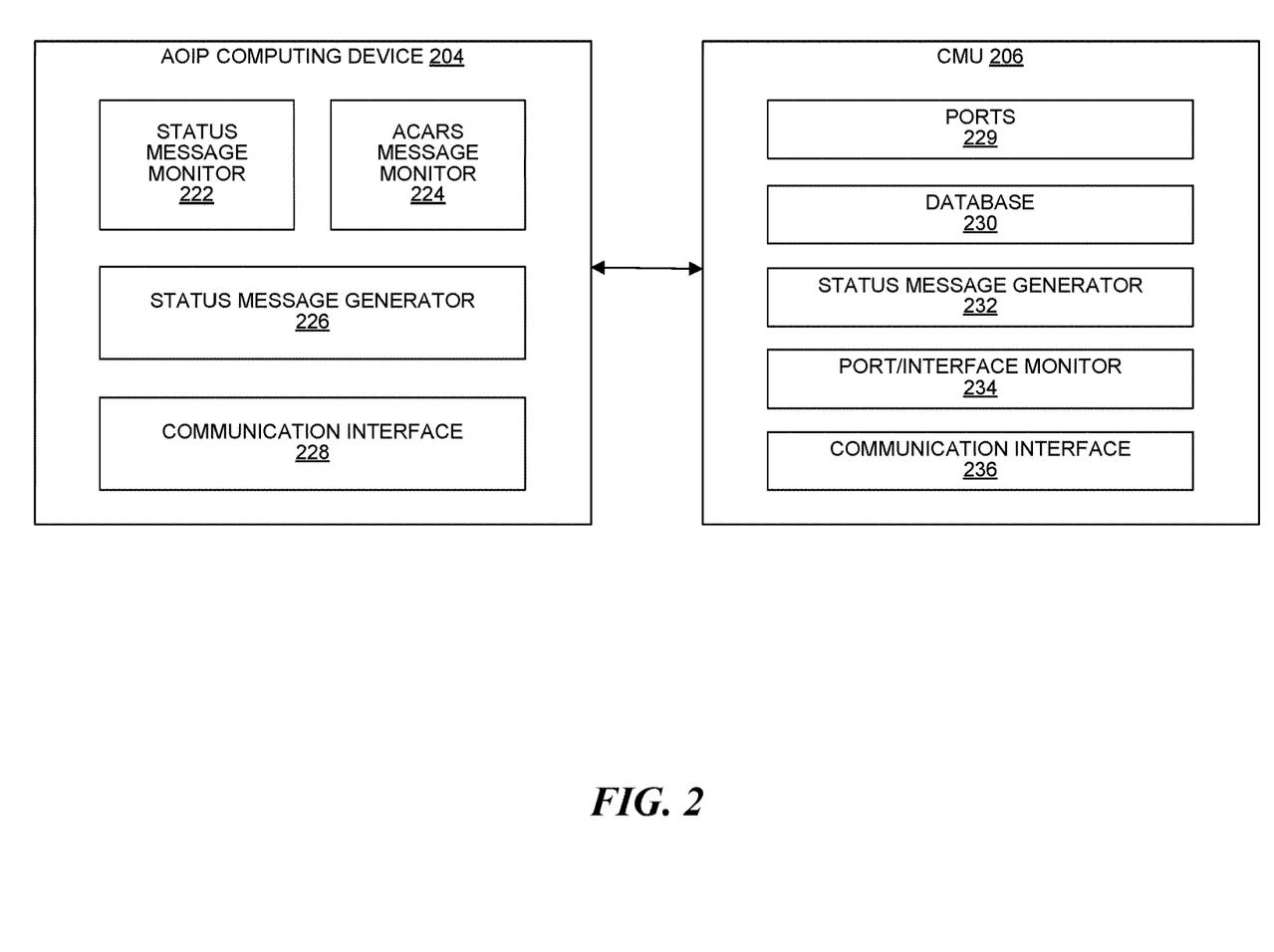
FIG. 2 is a block diagram illustrating an example AOIP computing device communicatively coupled with an example CMU.

FIG. 2 is a block diagram illustrating an example AOIP computing device 204 communicatively coupled with an example CMU 206. The AOIP computing device 204 and the CMU 206 may be examples of devices included in the ACARS over IP system 100 for non-safety messages illustrated in FIG. 1. The AOIP computing device 204 may be implemented using one or more processors 105 that execute instructions stored in a memory. Similarly, the CMU 206 may be implemented using one or more processors 107 that execute instructions stored in a memory. The CMU 206 may also be a CMU may also be control management function (CMF), an Air Traffic Services Unit (ATSU), an ACARS management unit (MU), etc.

The AOIP computing device 204 may be communicatively coupled to the CMU 206. The CMU 206 may include a plurality (e.g., at least two, at least three, etc.) of ports 229 that are used to communicatively couple the CMU 206 to various other interfaces, devices, and/or systems. Each port 229 may be a physical port located on the CMU 206 where a cable connector is plugged into the CMU 206.

The CMU 206 may include (or be communicatively coupled to) a database 230. The database 230 may include data indicating at least a priority for each type of ACARS message per port 229. For example, if the CMU 206 has a VHF port 229, a SATCOM port 229 and an HF port 229 (e.g., that the AOIP computing device 204 is connected to), the database 230 may include data indicating a priority for ACARS safety messages for each of the VHF port 229, the SATCOM port 229 and the HF port 229. Similarly, the database 230 may include data indicating a priority for ACARS non-safety messages for each of the VHF port 229, the SATCOM port 229 and the HF port 229. It should be noted that the priority for a given port 229 may be different for ACARS safety messages than for ACARS non-safety messages. For example, a particular port 229 (e.g., the VHF port 229, the SATCOM port 229, or the HF port 229) may be the lowest priority port 229 for ACARS safety messages and the highest priority port 229 for ACARS non-safety messages. Additionally, or alternatively, the CMU 206 may be configured in other ways (other than the database 230).

The CMU 206 may also generate CMU status messages using a status message generator 232. The CMU 206 may broadcast the CMU status messages periodically on the A429 bus, e.g., once per second. The status messages may include an indication of availability (COMM/NO COMM) of each of the subnetworks 122, 124. The CMU 206 may also monitor the availability of ports 229 and/or communication interfaces using a port/interface monitor 234. For example, the CMU 206 may monitor the availability of the VHF port 229, the SATCOM port 229, the HF port 229 (that is used to couple the AOIP computing device 104 to the CMU 106), the VHF interface 112, the SATCOM interface 114, and/or the IP broadband interface 110, respectively. Monitoring the HF port 229 may include monitoring a status message received from the AOIP computing device 204. The CMU 206 may continually track the availability of each port 229 and/or communication interface that may be available to the CMU 206, and store indicators relating to availability, e.g., in the database 230. Therefore, the status of the ports 229 may be monitored by monitoring the status message(s), an indication (COMM/NO COMM) by the port 229, or based on higher layer's determination (COMM/NO COMM) of a corresponding datalink's availability. Monitoring the availability of the subnetworks 122, 124 and/or ports 229 may, additionally or alternatively, include determining whether downlink messages are being acknowledged, e.g., after at most a predetermined number of tries.

In a first example, the AOIP computing device 204 may be connected to the CMU 206 on an HF port 229, while the CMU 206 is connected to a VHF interface 112 (via a VHF port 229) and a SATCOM interface 114 (via a SATCOM port 229). The HF port 229 may be assigned as the lowest priority port 229 (from the subnetwork selection perspective) for ACARS safety messages and the highest priority port 229 for some (or all) ACARS non-safety messages.

Prior to receiving any ACARS safety messages (and/or determining that all safety subnetworks 122 are unavailable), the CMU 206 may transmit ACARS safety messages via higher preferred safety subnetworks 122 (e.g., VHF or SATCOM), but ACARS non-safety messages may be sent to the AOIP computing device 204, which appears to be an HF radio/interface to the CMU 206, via the HF port 229. The AOIP computing device 204 may use an IP broadband interface 110 to transmit the ACARS non-safety messages via a non-safety subnetwork 124. The AOIP computing device 204 may also transmit (e.g., periodically broadcast) a first status message indicating that the AOIP computing device 204 is available. The AOIP computing device 204 may also discard any ACARS safety messages received from the CMU 206.

The AOIP computing device 204 may monitor the availability of ports 229 using a status message monitor 222 that monitors CMU status messages periodically broadcast, e.g., once per second. Additionally, the AOIP computing device 204 may determine whether received ACARS messages are ACARS safety messages or ACARS non-safety messages using an ACARS message monitor 224 that reads addressing information in the packet header of the ACARS message.

If all the ports 229 that are assigned a higher priority for ACARS safety messages become unavailable (i.e., the VHF port 229 and the SATCOM port 229), the CMU 206 may send ACARS safety messages to the AOIP computing device 204 via the HF port 229 (because the AOIP computing device 204 appears, to the CMU 206, as an HF radio/interface that is approved to transmit ACARS safety messages). Accordingly, when all higher-priority ports 229 for ACARS safety messages are unavailable (i.e., the VHF port 229 and the SATCOM port 229) and the AOIP computing device 204 receives an ACARS safety message, the AOIP computing device 204 may (1) generate (e.g., using a status message generator 226) and broadcast a status message indicating that the AOIP computing device 204 (connected on the HF port 229) is unavailable (e.g., by setting bits in the label 270 word sent to the CMU 206 over 429 or by stopping transmission of label 270 status words); and (2) discard any received ACARS safety message. In an alternative example, the AOIP computing device 204 may broadcast its unavailability as soon as the safety subnetworks 122 are unavailable. In another alternative example, the AOIP computing device 204 may broadcast its unavailability as soon as an ACARS safety message is received without concern for the availability of the safety subnetworks 122 or the non-safety subnetwork(s) 124.

After broadcasting its unavailability, the AOIP computing device 204 may monitor the availability status of the safety subnetworks 122, e.g., by looking for label 270 CMU status words broadcast by the CMU 206 on the A429 bus. When the VHF port 229 and/or the SATCOM port 229 become available, the AOIP computing device 204 may generate (e.g., using the status message generator 226) and broadcast a message indicating that the AOIP computing device 204 is available again. At that point, the ACARS safety message may again be transmitted on a safety subnetwork 122 via the VHF port 229 and/or the SATCOM port 229, while ACARS non-safety messages may be transmitted on a non-safety subnetwork 124 via the HF port 229 (connected to the AOIP computing device 204). Once the AOIP computing device 204 receives the ACARS non-safety message from the CMU 206 (and the AOIP computing device 204 is in available mode), the AOIP computing device 204 may transmit the ACARS non-safety message to the IP broadband interface 110 via the communication interface 228.

In a second example, the AOIP computing device 204 may be connected to the CMU 206 on a SATCOM port 229, while the CMU 206 is connected to a VHF interface 112 (via a VHF port 229). The CMU 206 may not include an HF port 229 in this example. The SATCOM port 229 may be assigned as the lowest priority port 229 (from the subnetwork selection perspective) for ACARS safety messages and the highest priority port 229 for some (or all) ACARS non-safety messages. The CMU 206 may transmit ACARS safety messages via higher preferred subnetworks (i.e., VHF), but ACARS non-safety messages may be sent via the AOIP computing device 204, which appears to be a SATCOM radio to the CMU 206.

Prior to receiving any ACARS safety messages (and/or determining that all safety subnetworks 122 are unavailable), the CMU 206 may transmit ACARS safety messages via higher preferred safety subnetworks 122 (e.g., VHF), and ACARS non-safety messages via a non-safety subnetwork 124 (using an IP broadband interface 110). The AOIP computing device 204 may also transmit (e.g., periodically broadcast) a first status message indicating that the AOIP computing device 204 is available. The AOIP computing device 204 may also discard any ACARS safety messages received from the CMU 206.

If all the ports 229 that are assigned a higher priority for ACARS safety messages (i.e., the VHF port 229) become unavailable, ACARS safety messages may be sent to the AOIP computing device 204 via the SATCOM port 229 (because the AOIP computing device 204 appears, to the CMU 206, as a SATCOM interface 114 that is approved to transmit ACARS safety messages). If all higher-priority ports 229 for ACARS safety messages (i.e., the VHF port 229) are unavailable and the AOIP computing device 204 receives an ACARS safety message, the AOIP computing device 204 may discard the ACARS safety message, and generate (e.g., using the status message generator 226) and broadcast a second status message indicating that the AOIP computing device 204 is unavailable.

After broadcasting its unavailability, the AOIP computing device 204 may monitor the availability status of the VHF port 229. When the VHF port 229 becomes available, the AOIP computing device 204 may generate (e.g., using the status message generator 226) and broadcast a first status message indicating that the AOIP computing device 204 is available again. At that point, the ACARS safety message may again be transmitted on a safety subnetwork 122 via the VHF port 229, while ACARS non-safety messages may be transmitted on a non-safety subnetwork 124 via the SATCOM port 229 (connected to the AOIP computing device 204). Once the AOIP computing device 204 receives the ACARS non-safety message from the CMU 206 (and the AOIP computing device 204 is in available mode), the AOIP computing device 204 may transmit the ACARS non-safety message to the IP broadband interface 110 via the communication interface 228.

Figure 3:
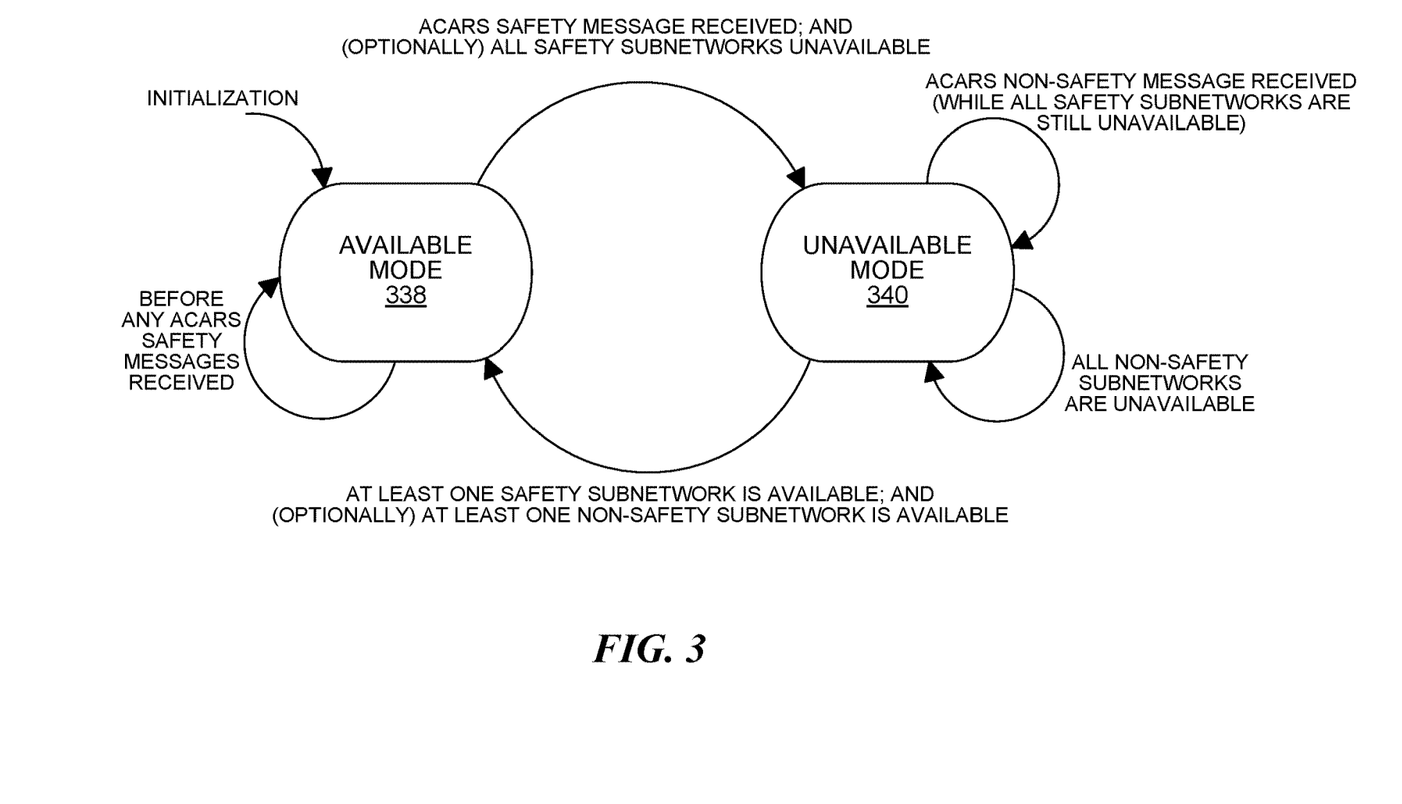
FIG. 3 is a block diagram illustrating state transitions of an AOIP computing device.

FIG. 3 is a block diagram illustrating state transitions of an AOIP computing device 104. Specifically, FIG. 3 illustrates an AOIP computing device 104 transitioning between an available mode 338 and an unavailable mode 340 in response to various stimulus. It should be noted that the various transitions illustrated in FIG. 3 may or may not occur in a specific order, and may or may not occur at all. For example, the AOIP computing device 104 may transition from available mode 338 to unavailable mode 340, and may never transition back to available mode 338, e.g., due to system failure.

In available mode 338, the AOIP computing device 104 may receive ACARS non-safety messages from the CMU 106 and transmit them on a non-safety subnetwork 124 to a peer server 120 using the IP broadband interface 110. In available mode 338, the AOIP computing device 104 may also transmit (e.g., periodically broadcast) a first status message indicating that the AOIP computing device 104 (and corresponding port 229) is/are in available mode 338, e.g., by transmitting a status word on the A429 data bus that the CMU 106 can read. While in the available mode, the AOIP computing device 104 may discard any ACARS safety messages it receives while in available mode 338.

In unavailable mode 340, the AOIP computing device 104 may transmit (e.g., periodically broadcast) a second status message indicating unavailability of the AOIP computing device 104 (and corresponding port 229, e.g., HF port 229 or SATCOM port 229). The second status message may be transmitted as a status word on the A429 bus that the CMU 106 can read. The AOIP computing device 104 may also discard all ACARS safety messages and ACARS non-safety messages it receives from the CMU 106 while in unavailable mode 340.

Following initialization (and before receiving any ACARS safety message), the AOIP computing device 104 may enter available mode 338. Since the AOIP computing device 104 may be communicatively coupled to the CMU 106 on an HF (or SATCOM) port 229, the CMU 106 may transmit ACARS safety messages to the AOIP computing device 106 even though the AOIP computing device 104 (and the non-safety subnetwork(s) 124) may not be approved to transmit ACARS safety messages.

In order to prevent and/or minimize problems associated with ACARS safety messages being sent to the AOIP computing device 104, the AOIP computing device 104 may transition to unavailable mode 340 in response to receiving an ACARS safety message. Optionally, the AOIP computing device 104 may also required to determine that all safety subnetworks 122 are unavailable (e.g., by viewing a CMU status message) before transitioning to unavailable mode 340. In other words, when the most recently received ACARS message is an ACARS safety message, and all safety subnetworks 122 are unavailable, the AOIP computing device 104 may transition to unavailable mode 340.

While in unavailable mode 340, the AOIP computing device 104 may preferably not transition to available mode 338 in response to receiving an ACARS non-safety message when all safety subnetworks 122 are still unavailable (e.g., as indicated in the most recent CMU status message). In other words, the AOIP computing device 104 may remain in unavailable mode 340 even if it receives an ACARS non-safety message as long as all safety subnetworks 122 are still unavailable. Similarly, the AOIP computing device 104 may also remain in unavailable mode 340 while all non-safety subnetwork(s) 124 is/are unavailable, even if one or more safety subnetworks 122 become available, i.e., the AOIP computing device 104 may transition to available mode 338 only when at least one non-safety subnetwork 124 is available.

While in unavailable mode 340, the AOIP computing device 104 may transition to available mode 338 in response to determining that at least one safety subnetwork 122 is available (e.g., by viewing a CMU status message). Optionally, the AOIP computing device 104 may also be required to determine that at least one non-safety subnetwork 124 is available before transitioning to available mode 338. In other words, when at least one safety subnetwork 122 (and optionally at least one non-safety subnetwork 124) is/are available (while the AOIP computing device 104 is in unavailable mode 340), the AOIP computing device 104 may transition back to available mode 338.

Figure 4:
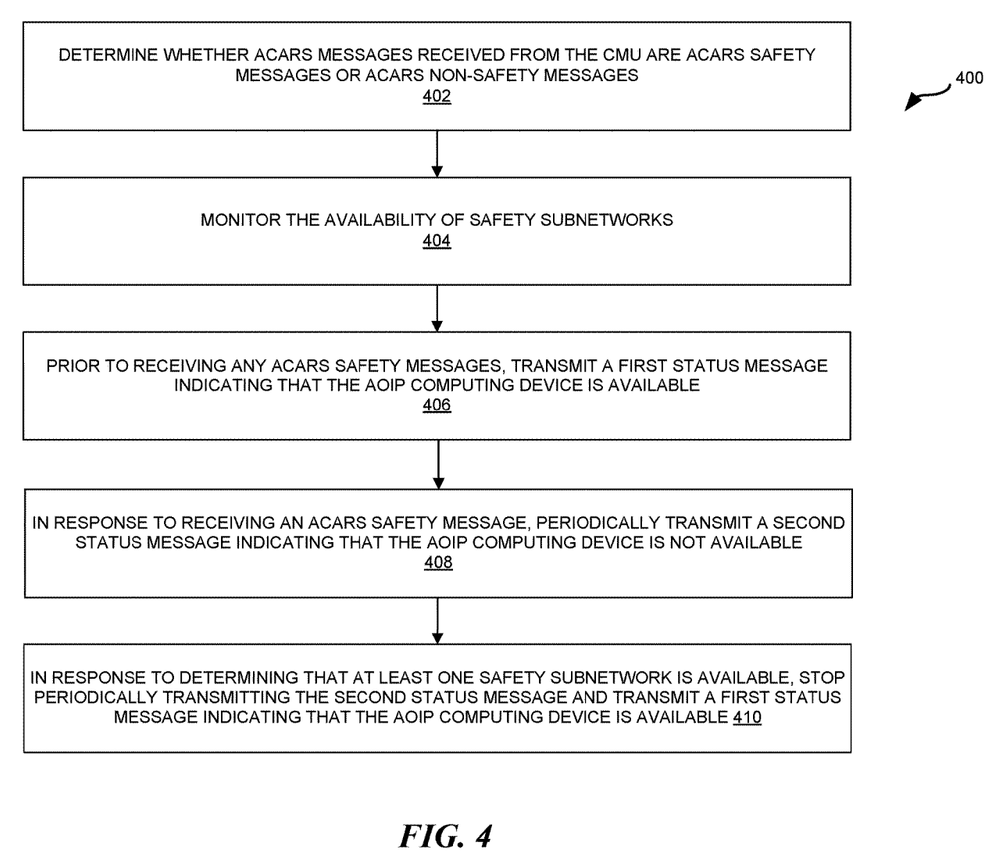
FIG. 4 is a flow diagram illustrating an example computerized method for transmitting ACARS non-safety messages using an AOIP computing device.

FIG. 4 is a flow diagram illustrating an example computerized method 400 for transmitting ACARS non-safety messages using an AOIP computing device 104. The method 400 may be performed by at least one processor 105 executing instructions in a memory, e.g., at least one processor 105 and a memory in the AOIP computing device 104.

The AOIP computing device 104 may be communicatively coupled to a CMU 106, e.g., on a CMU port 229 (e.g., VHF, SATCOM, or HF) that is assigned as a lowest priority port 229 for ACARS safety messages and a highest priority port 229 for ACARS non-safety messages. The AOIP computing device 104 may also be communicatively coupled to an IP broadband interface 110 that may be used to transmit ACARS non-safety messages via a non-safety subnetwork 124. In other words, the AOIP computing device 104 may be connected to the CMU 106 on a port 229 that is approved to transmit ACARS safety messages and ACARS non-safety messages, while the AOIP computing device 104 may only have access to one or more communication interfaces (i.e., the IP broadband interface 110) that are not approved to transmit ACARS safety messages.

The at least one processor 105 may be configured to determine 402 whether ACARS messages received from the CMU 106 are ACARS safety messages or ACARS non-safety messages. The at least one processor 105 may identify ACARS safety messages by looking at addressing information in the packet header of the ACARS message, i.e., a label field or label and sublabel fields in the header of an ACARS message (e.g., multiple 32-bit status words) transmitted on the A429 bus.

The at least one processor 105 may also be configured to monitor 404 availability of one or more safety subnetworks 122. For example, the at least one processor 105 may monitor CMU status messages that are broadcast by the CMU 106, e.g., once per second on the A429 data bus. The status of the safety subnetworks 122 may also be determined in other ways, e.g., listening directly to the radio for a radio status. Each CMU status message may be a 32-bit status word transmitted on the A429 bus, including a header and a payload. The payload may include a bit that indicates availability for each of the safety subnetworks 122, e.g., two bits for two safety subnetworks 122 accessible to the CMU 106.

The at least one processor 105 may also be configured to transmit 406, prior to receiving any ACARS safety messages (and, optionally, determining that all safety subnetworks 122 are unavailable), a first status message indicating that the AOIP computing device 104 is available. The at least one processor 105 may also be configured to transmit, as long as the AOIP computing device does not receive an ACARS safety message, the ACARS non-safety messages to a peer server 120 via at least one non-safety subnetwork 124. The at least one processor 105 may also be configured to discard any ACARS safety messages received from the CMU 106.

The at least one processor 105 may also be configured to periodically transmit 408, in response to receiving an ACARS safety message, a second status message indicating that the AOIP computing device 104 is unavailable. Optionally, the AOIP computing device 104 may also be required to (while the AOIP computing device 104 is in unavailable mode) determine that all safety subnetworks 122 are unavailable (e.g., by viewing a CMU status message) before transmitting the second status message. The at least one processor 105 may also be configured, at this point, to discard all received ACARS safety messages.

The at least one processor 105 may also be configured to, in response to determining that at least one safety subnetwork 124 is available (e.g., by viewing a CMU status message), stop 410 periodically transmitting the second status message and, instead, transmit a first status message indicating that the AOIP computing device 104 is available. Optionally, the AOIP computing device 104 may also be required to (while the AOIP computing device 104 is in unavailable mode) determine that at least one non-safety subnetwork 124 is available (e.g., by viewing a CMU status message) before stopping transmission of the second status message and resuming the transmission of the first status message.

Figure 5:
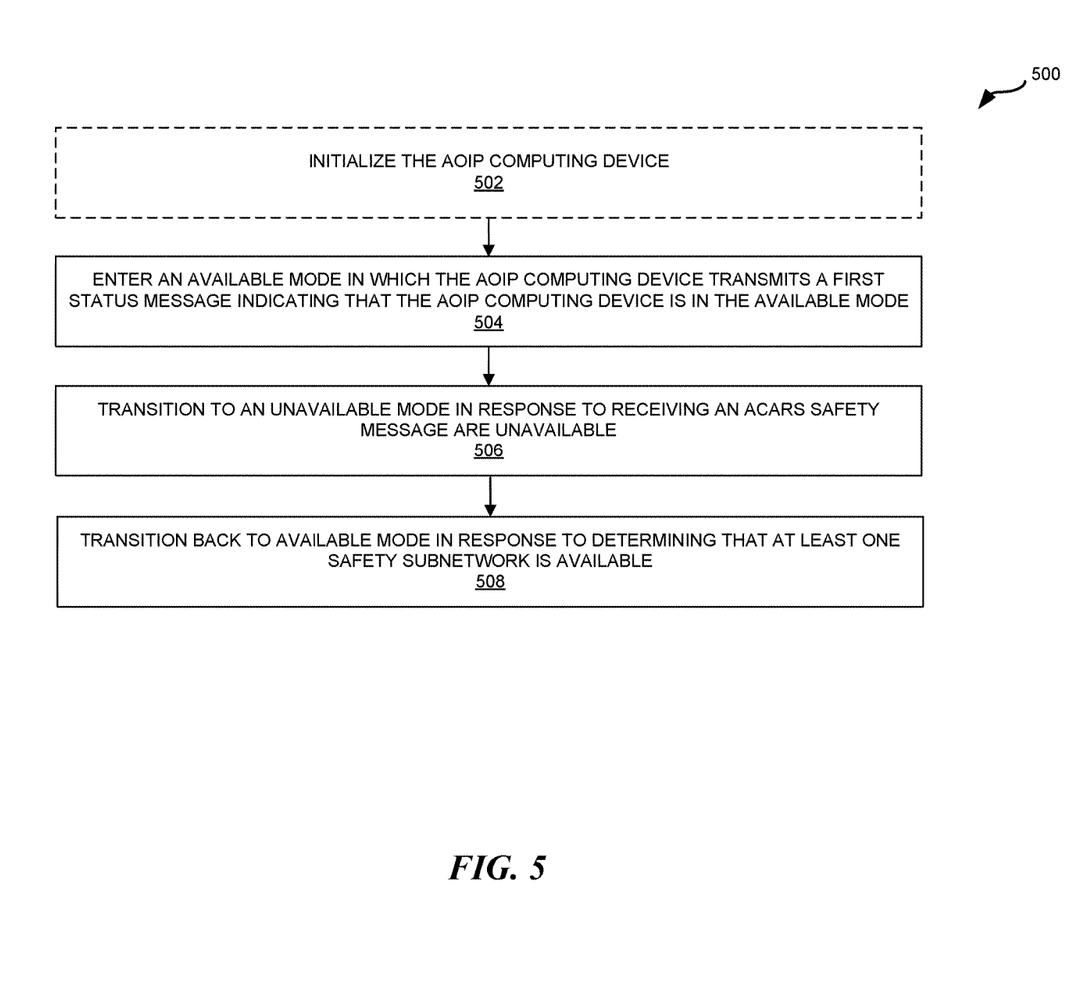
FIG. 5 is a flow diagram illustrating an example computerized method for transmitting ACARS non-safety messages using an AOIP computing device.

FIG. 5 is a flow diagram illustrating an example computerized method 500 for transmitting ACARS non-safety messages using an AOIP computing device 104. The method 500 may be performed by at least one processor 105 executing instructions in a memory, e.g., at least one processor 105 and a memory in the AOIP computing device 104.

The AOIP computing device 104 may be communicatively coupled to a CMU 106, e.g., on a CMU port 229 (e.g., VHF, SATCOM, or HF) that is assigned as a lowest priority port 229 for ACARS safety messages and a highest priority port 229 for ACARS non-safety messages. The AOIP computing device 104 may also be communicatively coupled to an IP broadband interface 110 that may be used to transmit ACARS non-safety messages via a non-safety subnetwork 124. In other words, the AOIP computing device 104 may be connected to the CMU 106 on a port 229 that is approved to transmit ACARS safety messages and ACARS non-safety messages, while the AOIP computing device 104 may only have access to one or more communication interfaces (i.e., the IP broadband interface 110) that are not approved to transmit ACARS safety messages.

Optionally, the at least one processor 105 may be configured to initialize 502 the AOIP computing device 104. This may include powering up the AOIP computing device 104 and/or executing a startup sequence of instructions, e.g., after installation or repair, soft reset, and/or hard reset of the AOIP computing device 104. Alternatively, the AOIP computing device 104 may already be running without requiring initialization.

The at least one processor 105 may be configured to enter 504 an available mode in which the AOIP computing device 104 may: (1) transmit (e.g., periodically broadcasts) a first status message indicating that the AOIP computing device 104 (and corresponding port 229) is/are in available mode 338; (2) receive ACARS non-safety messages from the CMU 106 and transmit them to a peer server 120 via a non-safety subnetwork 124; and (3) discard any received ACARS safety messages. Each first status message may be a 32-bit status word transmitted on an A429 data bus.

The at least one processor 105 may also be configured to transition 506 to an unavailable mode 340 in response to receiving an ACARS safety message. Optionally, the at least one processor 105 may also be configured (while the AOIP computing device is in available mode) to determine that all safety subnetworks 122 (e.g., the VHF interface 112 and/or the SATCOM interface 114) are unavailable before transitioning to unavailable mode. In unavailable mode 340, the AOIP computing device 104 may: (1) transmit (e.g., periodically broadcast) a second status message indicating that the AOIP computing device 104 is in unavailable mode; and (2) discard any ACARS safety messages. The second status message(s) may be 32-bit status words transmitted on an A429 data bus.

While in unavailable mode 340, the AOIP computing device 104 may preferably not transition to available mode 338 in response to receiving an ACARS non-safety message when all safety subnetworks 122 are still unavailable (as indicated in the most recent CMU status message). In other words, the AOIP computing device 104 may remain in unavailable mode 340 even if it receives an ACARS non-safety message as long as all safety subnetworks 122 are still unavailable. Similarly, the AOIP computing device 104 may also remain in unavailable mode 340 while all non-safety subnetwork(s) 124 is/are unavailable, even if one or more safety subnetworks 122 become available, i.e., the AOIP computing device 104 may transition to available mode 338 only when at least one non-safety subnetwork 124 is available.

The at least one processor 105 may also be configured to transition 508 back to available mode 338 in response to determining that at least one safety subnetwork 122 is available (e.g., by viewing a CMU status message). Optionally, the at least one processor 105 may also be configured (while the AOIP computing device 104 is in unavailable mode) to determine that at least one non-safety subnetwork 124 is available (e.g., by viewing a CMU status message) before transitioning from unavailable mode to available mode. In other words, when at least one safety subnetwork 122 (and optionally at least one non-safety subnetwork 124) are available (while the AOIP computing device 104 is in unavailable mode 340), the AOIP computing device 104 may transition back to available mode 338.

Electronic Device Overview

Configurations of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Figure 6:
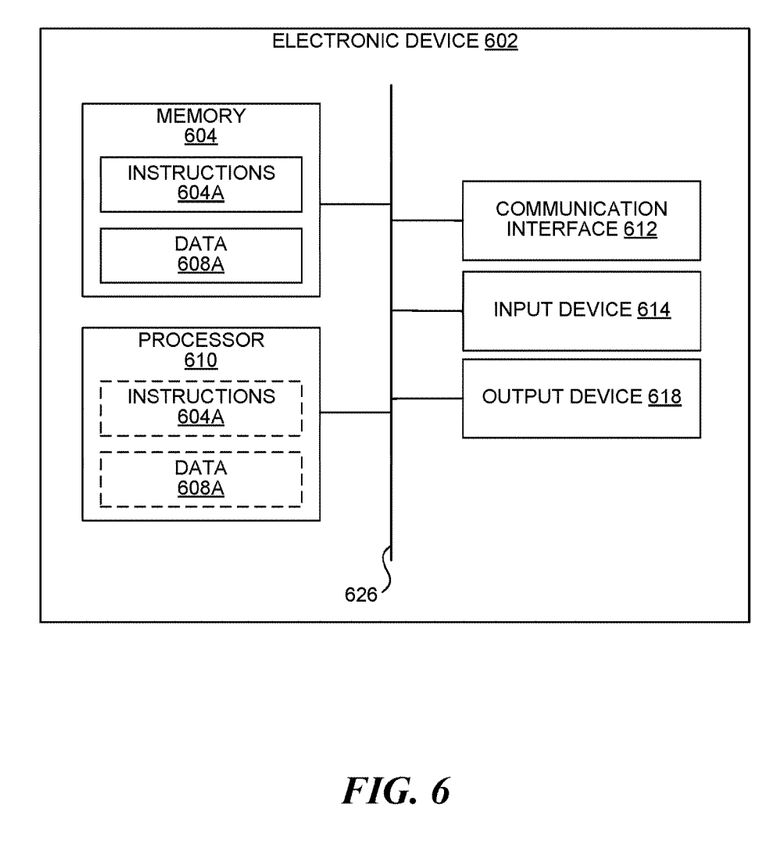
FIG. 6 is a block diagram illustrating an example of an electronic device that may be utilized in some configurations of the present disclosure.

As such, FIG. 6 is a block diagram illustrating an example of an electronic device that may be utilized in some configurations of the present disclosure. The illustrated components may be located within the same physical structure or in separate housings or structures. The AOIP computing device 104, CMU 106, router 108, peer server(s) 120, and/or datalink service provider(s) 116 described above may utilize one or more of the electronic devices 602 described in FIG. 6. The electronic device 602 includes a processor 610. The processor 610 may be a general purpose single- or multi-chip microprocessor (e.g., an ARM), a special purpose microprocessor (e.g., a digital signal processor (DSP)), a microcontroller, a programmable gate array, a Field Programmable Gate Array (FPGA), an application specific integrated circuit (ASIC), etc. The processor 610 may be referred to as a central processing unit (CPU). Although just a single processor 610 is shown in the electronic device 602 of FIG. 6, in an alternative configuration, a combination of processors (e.g., an ARM and DSP) could be used.

The electronic device 602 also includes memory 604 in electronic communication with the processor 610. That is, the processor 610 can read information from and/or write information to the memory 604. The memory 604 may be any electronic component capable of storing electronic information. The memory 604 may include a machine-readable medium (also referred to as a computer-readable medium) having stored thereon instructions that may be used to program a computer (or other electronic devices) to perform a process. The machine-readable medium may include, for example, floppy diskettes, optical disks, compact disc read-only memories (CD-ROMs), digital video discs (DVDs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. The machine-readable medium may be tangible and non-transitory.

Data 608a and instructions 606a may be stored in the memory 604. The instructions 606a may include one or more programs, routines, sub-routines, functions, procedures, etc. The instructions 606a may include a single computer-readable statement or many computer-readable statements. The instructions 606a may be executable by the processor 610 to implement one or more of the methods, functions and procedures described above. Executing the instructions 606a may involve the use of the data 608a that is stored in the memory 604. FIG. 6 shows some instructions 606b and data 608b being loaded into the processor 610 (which may come from instructions 606a and data 608a).

The electronic device 602 may also include one or more communication interfaces 612 for communicating with other electronic devices. The communication interfaces 612 may be based on wired communication technology, wireless communication technology, or both. Examples of different types of communication interfaces 612 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. For example, a CMU 106 may interface with a Multifunction Control Display Unit (MCDU) Human Machine Interface (HMI).

The electronic device 602 may also include one or more input devices 614 and one or more output devices 618, e.g., used in conjunction with a user interface. Examples of different kinds of input devices 614 include a keyboard, mouse, microphone, camera remote control device, button, touchscreen, etc. For instance, the electronic device 602 may include one or more microphones 616 that convert acoustic signals (e.g., voice, speech) into electrical or electronic signals. In another example, a camera may track position and/or motion of an object and convert the image(s)/video into instructions to control other devices. Examples of different possible output devices 618 include a speaker, printer, display device, etc.

The various components of the electronic device 602 may be coupled together by one or more buses, which may include a power bus, a control signal bus, a status signal bus, a data bus, etc. For simplicity, the various buses are illustrated in FIG. 6 as a bus system 626. Furthermore, various other architectures and components may be utilized in connection with any electronic device described herein.

Terminology

Brief definitions of terms, abbreviations, and phrases used throughout this application are given below.

The term "determining" may include calculating, computing, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary configurations", "in example configurations", "in some configurations", "according to some configurations", "in the configurations shown", "in other configurations", "configurations", "in examples", "examples", "in some examples", "some examples" and the like generally mean the particular feature, structure, or characteristic following the phrase is included in at least one configuration of the present disclosure, and may be included in more than one configuration of the present disclosure. In addition, such phrases do not necessarily refer to the same configurations or different configurations.

If the specification states a component or feature "may," "can," "could," or "might" be included or have a characteristic, that particular component or feature is not required to be included or have the characteristic.

The terms "responsive" or "in response to" may indicate that an action is performed completely or partially in response to another action.

The term "module" refers broadly to a software, hardware, circuitry, or firmware (or any combination thereof) component. Modules are typically functional components that can generate useful data or other output using specified input(s). A module may or may not be self-contained. An application program (also called an "application") may include one or more modules, or a module can include one or more application programs.

Also, for the sake of illustration, various configurations of the present disclosure have herein been described in the context of computer programs, physical components, and logical interactions within modern computer networks. Importantly, while these configurations describe various configurations of the present disclosure in relation to modern computer networks and programs, the method and apparatus described herein are equally applicable to other systems, devices, and networks as one skilled in the art will appreciate. As such, the illustrated applications of the configurations of the present disclosure are not meant to be limiting, but instead are examples. Other systems, devices, and networks to which configurations of the present disclosure are applicable include, for example, other types of communication and computer devices and systems. More specifically, configurations are applicable to communication systems, services, and devices such as cell phone networks and compatible devices. In addition, configurations are applicable to all levels of computing from the personal computer to large network mainframes and servers.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

In conclusion, the present disclosure provides novel systems, methods, and arrangements for an ACARS over IP system for non-safety messages. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a communication system in an aircraft, comprising: a communications management unit (CMU) that is coupled to at least one safety subnetwork and an Aircraft Communications Addressing and Reporting System (ACARS) over IP (AOIP) computing device; the AOIP computing device, wherein the AOIP computing device is coupled to at least one non-safety subnetwork, wherein the AOIP computing device determines whether ACARS messages received from the CMU are ACARS safety messages or ACARS non-safety messages; wherein the AOIP computing device monitors CMU status messages from the CMU; wherein, in response to the AOIP computing device receiving an ACARS safety message, the AOIP computing device periodically transmits a second status message indicating that the AOIP computing device is unavailable; and wherein, in response to determining that at least one safety subnetwork is available, the AOIP computing device stops periodically transmitting the second status message and transmits a first status message indicating that the AOIP computing device is available.

Example 2 includes the communication system of Example 1, wherein the AOIP computing device periodically transmits a second status message indicating that the AOIP computing device is unavailable further in response to determining that all safety subnetworks are unavailable.

Example 3 includes the communication system of any of Examples 1-2, wherein the AOIP computing device stops periodically transmitting the second status message further in response to determining that at least one of the at least one non-safety subnetwork is available.

Example 4 includes the communication system of any of Examples 1-3, wherein prior to receiving any ACARS safety messages, the AOIP computing device transmits the first status message indicating that the AOIP computing device is available.

Example 5 includes the communication system of any of Examples 1-4, wherein prior to receiving any ACARS safety messages, the AOIP computing device also transmits the ACARS non-safety messages to a peer server via the at least one non-safety subnetwork.

Example 6 includes the communication system of any of Examples 1-5, wherein the CMU is communicatively coupled to the AOIP computing device on a port that is assigned as a lowest priority port for the ACARS safety messages and a highest priority port for the ACARS non-safety messages.

Example 7 includes the communication system of Example 6, wherein the port used to communicatively couple the AOIP computing device to the CMU is approved to transmit ACARS safety messages and ACARS non-safety messages, wherein the AOIP computing device is not approved to transmit ACARS safety messages.

Example 8 includes a computerized method for transmitting Aircraft Communications Addressing and Reporting System (ACARS) non-safety messages using an ACARS over IP (AOIP) computing device, comprising: determining whether ACARS messages received from the CMU are ACARS safety messages or ACARS non-safety messages; monitoring CMU status messages from the CMU; in response to receiving an ACARS safety message, periodically transmitting a second status message indicating that the AOIP computing device is unavailable; and in response to determining that at least one safety subnetwork is available, stopping periodically transmitting the second status message and transmit a first status message indicating that the AOIP computing device is available.

Example 9 includes the computerized method of Example 8, wherein periodically transmitting a second status message indicating that the AOIP computing device is unavailable is further performed in response to determining that all safety subnetworks are unavailable.

Example 10 includes the computerized method of any of Examples 8-9, wherein the stopping periodically transmitting the second status message is further performed in response to determining that at least one of the at least one non-safety subnetwork is available.

Example 11 includes the computerized method of any of Examples 8-10, further comprising, prior to receiving any ACARS safety messages, transmitting the first status message indicating that the AOIP computing device is available.

Example 12 includes the computerized method of any of Examples 8-11, further comprising, prior to receiving any ACARS safety messages, transmitting the ACARS non-safety messages to a peer server via the at least one non-safety subnetwork.

Example 13 includes the computerized method of any of Examples 8-12, wherein the CMU is communicatively coupled to the AOIP computing device on a port that is assigned as a lowest priority port for the ACARS safety messages and a highest priority port for the ACARS non-safety messages.

Example 14 includes the computerized method of Example 13, wherein the port used to communicatively couple the AOIP computing device to the CMU is approved to transmit ACARS safety messages and ACARS non-safety messages, wherein the AOIP computing device is not approved to transmit ACARS safety messages.

Example 15 includes an Aircraft Communications Addressing and Reporting System (ACARS) over IP (AOIP) computing device that is coupled to a communications management unit (CMU) and at least one non-safety subnetwork, comprising: at least one processor configured to: determine whether ACARS messages received from the CMU are ACARS safety messages or ACARS non-safety messages; monitor CMU status messages from the CMU; in response to receiving an ACARS safety message and/or a CMU status message indicating that all safety subnetworks are unavailable, periodically transmit a second status message indicating that the AOIP computing device is unavailable; and in response to determining that at least one safety subnetwork is available, stop periodically transmitting the second status message and transmit a first status message indicating that the AOIP computing device is available.

Example 16 includes the AOIP computing device of Example 15, wherein the at least one processor is further configured to stop periodically transmitting the second status message further in response to determining that at least one of the at least one non-safety subnetwork is available.

Example 17 includes the AOIP computing device of Example 15, wherein the at least one processor is further configured to, prior to receiving any ACARS safety messages, transmit the first status message indicating that the AOIP computing device is available.

Example 18 includes the AOIP computing device of Example 15, wherein the CMU is communicatively coupled to the AOIP computing device on a port that is assigned as a lowest priority port for the ACARS safety messages and a highest priority port for the ACARS non-safety messages.

Example 19 includes the AOIP computing device of Example 18, wherein the port used to communicatively couple the AOIP computing device to the CMU is approved to transmit ACARS safety messages and ACARS non-safety messages, wherein the AOIP computing device is not approved to transmit ACARS safety messages.

Example 20 includes the AOIP computing device of any of Examples 15-19, wherein AOIP computing device is connected to the CMU on a high-frequency (HF) port that is approved, from the CMU perspective, to transmit ACARS safety messages and ACARS non-safety

What is claimed is:

1. A communication system in an aircraft, comprising:
a communications management unit (CMU) that is coupled to at least one safety subnetwork and an Aircraft Communications Addressing and Reporting System (ACARS) over IP (AOIP) computing device;
the AOIP computing device, wherein the AOIP computing device is coupled to at least one non-safety subnetwork,
wherein the AOIP computing device determines whether ACARS messages received from the CMU are ACARS safety messages or ACARS non-safety messages;
wherein the AOIP computing device monitors CMU status messages from the CMU;
wherein, in response to the AOIP computing device receiving an ACARS safety message, the AOIP computing device periodically transmits a second status message indicating that the AOIP computing device is unavailable; and
wherein, in response to determining that at least one safety subnetwork is available, the AOIP computing device stops periodically transmitting the second status message and transmits a first status message indicating that the AOIP computing device is available.

2. The communication system of claim 1, wherein the AOIP computing device periodically transmits a second status message indicating that the AOIP computing device is unavailable further in response to determining that all safety subnetworks are unavailable.

3. The communication system of claim 1, wherein the AOIP computing device stops periodically transmitting the second status message further in response to determining that at least one of the at least one non-safety subnetwork is available.

4. The communication system of claim 1, wherein prior to receiving any ACARS safety messages, the AOIP computing device transmits the first status message indicating that the AOIP computing device is available.

5. The communication system of claim 1, wherein prior to receiving any ACARS safety messages, the AOIP computing device also transmits the ACARS non-safety messages to a peer server via the at least one non-safety subnetwork.

6. The communication system of claim 1, wherein the CMU is communicatively coupled to the AOIP computing device on a port that is assigned as a lowest priority port for the ACARS safety messages and a highest priority port for the ACARS non-safety messages.

7. The communication system of claim 6, wherein the port used to communicatively couple the AOIP computing device to the CMU is approved to transmit ACARS safety messages and ACARS non-safety messages, wherein the AOIP computing device is not approved to transmit ACARS safety messages.

8. A computerized method for transmitting Aircraft Communications Addressing and Reporting System (ACARS) non-safety messages using an ACARS over IP (AOIP) computing device, comprising:
determining whether ACARS messages received from the CMU are ACARS safety messages or ACARS non-safety messages;
monitoring CMU status messages from the CMU;
in response to receiving an ACARS safety message, periodically transmitting a second status message indicating that the AOIP computing device is unavailable; and
in response to determining that at least one safety subnetwork is available, stopping periodically transmitting the second status message and transmit a first status message indicating that the AOIP computing device is available.

9. The computerized method of claim 8, wherein periodically transmitting a second status message indicating that the AOIP computing device is unavailable is further performed in response to determining that all safety subnetworks are unavailable.

10. The computerized method of claim 8, wherein the stopping periodically transmitting the second status message is further performed in response to determining that at least one of the at least one non-safety subnetwork is available.

11. The computerized method of claim 8, further comprising, prior to receiving any ACARS safety messages, transmitting the first status message indicating that the AOIP computing device is available.

12. The computerized method of claim 8, further comprising, prior to receiving any ACARS safety messages, transmitting the ACARS non-safety messages to a peer server via the at least one non-safety subnetwork.

13. The computerized method of claim 8, wherein the CMU is communicatively coupled to the AOIP computing device on a port that is assigned as a lowest priority port for the ACARS safety messages and a highest priority port for the ACARS non-safety messages.

14. The computerized method of claim 13, wherein the port used to communicatively couple the AOIP computing device to the CMU is approved to transmit ACARS safety messages and ACARS non-safety messages, wherein the AOIP computing device is not approved to transmit ACARS safety messages.

15. An Aircraft Communications Addressing and Reporting System (ACARS) over IP (AOIP) computing device that is coupled to a communications management unit (CMU) and at least one non-safety subnetwork, comprising:
at least one processor configured to:
determine whether ACARS messages received from the CMU are ACARS safety messages or ACARS non-safety messages;
monitor CMU status messages from the CMU;
in response to receiving an ACARS safety message and/or a CMU status message indicating that all safety subnetworks are unavailable, periodically transmit a second status message indicating that the AOIP computing device is unavailable; and
in response to determining that at least one safety subnetwork is available, stop periodically transmitting the second status message and transmit a first status message indicating that the AOIP computing device is available.

16. The AOIP computing device of claim 15, wherein the at least one processor is further configured to stop periodically transmitting the second status message further in response to determining that at least one of the at least one non-safety subnetwork is available.

17. The AOIP computing device of claim 15, wherein the at least one processor is further configured to, prior to receiving any ACARS safety messages, transmit the first status message indicating that the AOIP computing device is available.

18. The AOIP computing device of claim 15, wherein the CMU is communicatively coupled to the AOIP computing device on a port that is assigned as a lowest priority port for the ACARS safety messages and a highest priority port for the ACARS non-safety messages.

19. The AOIP computing device of claim 18, wherein the port used to communicatively couple the AOIP computing device to the CMU is approved to transmit ACARS safety messages and ACARS non-safety messages, wherein the AOIP computing device is not approved to transmit ACARS safety messages.

20. The AOIP computing device of claim 15, wherein AOIP computing device is connected to the CMU on a high-frequency (HF) port that is approved, from the CMU perspective, to transmit ACARS safety messages and ACARS non-safety messages.

* * * * *